US006859446B1

(12) United States Patent
Gopalakrishnan et al.

(10) Patent No.: US 6,859,446 B1
(45) Date of Patent: Feb. 22, 2005

(54) INTEGRATING POWER-CONTROLLED AND RATE-CONTROLLED TRANSMISSIONS ON A SAME FREQUENCY CARRIER

(75) Inventors: Nandu Gopalakrishnan, Chatham, NJ (US); Niranjan Sudhir Joshi, Randolph, NJ (US); Srinivas R. Kadaba, Chatham, NJ (US); Achilles George Kogiantis, Madison, NJ (US); Ashok N. Rudrapatna, Basking Ridge, NJ (US); Mehmet Oguz Sunay, Summit, NJ (US); Ganapathy Subramanian Sundaram, Scotch Plains, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 732 days.

(21) Appl. No.: 09/658,084

(22) Filed: Sep. 11, 2000

(51) Int. Cl.[7] .............................................. H04B 7/216
(52) U.S. Cl. ..................... 370/335; 370/335; 455/422.1
(58) Field of Search ................................ 370/335, 318, 370/252, 342, 332; 455/422.1, 522, 13.4; 375/227, 296, 346

(56) References Cited

U.S. PATENT DOCUMENTS

| 5,745,480 | A | | 4/1998 | Behtash et al. ............. 370/252 |
|---|---|---|---|---|
| 6,393,276 | B1 | * | 5/2002 | Vanghi .................... 455/422.1 |
| 6,563,810 | B1 | * | 5/2003 | Corazza ....................... 370/335 |
| 6,603,746 | B1 | * | 8/2003 | Larijani et al. ............. 370/318 |
| 6,782,271 | B2 | * | 8/2004 | Huh et al. .................. 455/522 |

FOREIGN PATENT DOCUMENTS

| WO | WO 99/23844 | 5/1999 | ............ H04Q/7/22 |
|---|---|---|---|
| WO | WO 99 23844 A | 5/1999 | ............ H04B/7/26 |

OTHER PUBLICATIONS

Meizhong Wang, et al, "A Wireless Multimedia DS–CDMA Network Based on Adaptive Transmission Rate/Power Control", *International Zurich Seminar on Broadband Communications*, (Feb. 17, 1998), pp. 45–50.
European Search Report.
Wang, M., et al.: "A Wireless Multipmedia DS–CDMA Networks Based on Adaptive Transmission Rate/Power Control", International Zurich Seminar on Broadband Communications. Accessing, Transmission, Networking, XX, XX, Feb. 17, 1998, pp. 45–50, XP002930743.
European Search Report dated Jan. 15, 2002.

* cited by examiner

*Primary Examiner*—Kenneth Vanderpuye
*Assistant Examiner*—Robert W. Wilson
(74) *Attorney, Agent, or Firm*—Jimmy Goo

(57) ABSTRACT

Disclosed is a method of integrating voice and data services onto a same frequency channel using available transmit power information to determine data rates, wherein the available transmit power information indicates an amount of transmit power available for future data transmissions over one or more data channels. In a "distributed" embodiment, a transmitter or base station transmits, via a forward link, an available power message to a receiver or mobile-telephone indicating an amount of available transmit power at some future time t+z. The mobile-telephone performs signal-to-interference measurements corresponding to the received forward link and received interference, and uses such signal-to-interference measurements and the available power message to determine a data rate that can be supported by the mobile-telephone. Preferably, the determined data rate corresponds to a maximum data rate at which a minimum level of quality of service can be achieved at the mobile-telephone. In a "centralized" embodiment, the mobile-telephone transmits the signal-to-interference measurements to the base station, and the base station determines the data rate based on the available transmit power at future time t+z.

24 Claims, 6 Drawing Sheets

92

10

19

20

30

INTEGRATING POWER-CONTROLLED AND RATE-CONTROLLED TRANSMISSIONS ON A SAME FREQUENCY CARRIER

FIELD OF THE INVENTION

The present invention relates generally to wireless communication systems and, in particularly, to third generation wireless communication systems having voice and data services.

BACKGROUND OF THE RELATED ART

In wireless communication systems based on Code Division Multiple Access (CDMA), there is a need to integrate real-time circuit switched services, such as voice services, and non-real time best-effort packet data services on a same frequency carrier. An extensive amount of work has been done to design systems that are optimized to support either real-time circuit switched services or non-real time best-effort packet data services. Currently, for most efficient resource utilization, the different services are provided on separate frequency carriers. However, providing the different services on separate frequency carriers makes it difficult to support simultaneous real-time circuit switched and non-real time best-effort pack data services for a same user. The obstacle preventing both types of services from being efficiently provided via a same frequency carrier is the limited amount of available transmit power per base station, as will be described herein.

FIG. 4 depicts a wireless communication system 10 employing CDMA techniques. The wireless communications system 10 comprises a mobile switching center (MSC) 12 and a plurality of base stations (BS) 14-$i$ connected to the MSC 12. Each of BS 14-$i$ has a maximum amount of available power $P_{max}$ for forward link or downlink transmissions to mobile-telephones (MT), such as mobile-telephones 16-$k$, within an associated geographical coverage area referred to herein as cell 18-$i$. For illustrative purposes, cells 18-$i$ are depicted as circular in shape with base stations 14-$i$ centrally positioned. It should be understood that cells 18-$i$ may also be noncircular in shape (e.g., hexagonal) with the base stations positioned non-centrally.

Second generation CDMA based wireless communication systems were optimized to support voice services. The systems utilize frame delivery over dedicated channels (or in other words, real-time circuit switched services) with very low delay and jitter to support voice services. In second generation CDMA based wireless communication systems, the forward link comprises a plurality of signals which have been combined and modulated onto a frequency carrier, wherein the plurality of signals includes a pilot signal, control signals and voice signals. The pilot and control signals are transmitted over a pilot channel and control channels defined by Walsh codes $W_{pilot}$ and $W_{control-cc}$ at fixed transmit powers $P_{pilot}$ and $P_{control-cc}$, respectively, wherein $P_{pilot}$ and $P_{control-cc}$ are fixed percentages of $P_{max}$ and "cc" denotes a specific control channel. Note that the pilot channel is always active because, in second generation CDMA systems, the pilot signal is a continuous pilot signal. By contrast, the control channels are not always active.

The voice signals are transmitted over traffic channels defined by Walsh codes $W_{voice-tc}$ at transmit power $P_{voice-tc}$, where "tc" denotes a specific traffic channel. The transmit power $P_{voice-tc}$ of the voice signals are dynamically power controlled based on users to which the associated voice signals are intended.

The fundamental objective of power control is to set the voice transmit power $P_{voice-tc}$ such that a desired quality of service (QOS) is obtained at a receiver for the associated voice signal. Power control comprises of outer and inner power control loops. Outer power control loops involve, for each traffic channel, setting a target signal-to-interference ratio (SIR) or other target control threshold that will achieve a desired frame error rate (FER) or other QOS parameter at the intended receiver for the voice signal. By contrast, inner power control loops involve, for each traffic channel, manipulating transmit power at the transmitter according to the target SIR set by the outer power control loop. Specifically, the inner power control loop measures SIR at the receiver over a time interval referred to herein as a power control group (PCG). If the measured SIR is greater than the target SIR, the receiver transmits power control bits on the reverse link or uplink indicating to the transmitter to increase its transmit power an up transmit step size. By contrast, if the measured SIR is less than the target SIR, the receiver transmits power control bits indicating to the transmitter to decrease its transmit power a down transmit step size. This manipulation of power ensures that the SIR at the receiver is at or near the target SIR in order to achieve the desired QOS at the receiver. Note that power control may also be applied to signals other than voice.

FIG. 5 depicts a chart 19 illustrating forward link transmit power $P_{fl}$ versus time at BS 14-$i$ for a forward link comprising pilot, control and voice signals, wherein forward link transmit power $P_{fl}$ is the sum of the transmit powers of the signals comprising the forward link, i.e., $P_{fl} = \Sigma P_{pilot} + P_{control-cc} + P_{voice-tc}$. Note that the pilot transmit power $P_{pilot}$ is fixed because the pilot signal is continuously being transmitted over the pilot channel at a fixed transmit power. By contrast, the combined control and voice transmit powers $P_{control-cc}$ and $P_{voice-tc}$ is variable for a number of reasons: the control and traffic channels are not always active; the traffic channels are dynamically power controlled; and traffic channels are being added and dropped as calls to mobile-telephones are being completed and terminated. The forward link transmit power $P_{fl}$ preferably should not exceed the maximum transmit power at BS 14-$i$ otherwise calls may be dropped due to a number of reasons, such as degradation in quality.

In third generation CDMA based wireless communication systems, data services have been added. Data services differ from voice services in a number of manners. Voice services utilize real-time circuit-switched services in which channels are dedicated. Real-time circuit switch services involve frame delivery with very low delay and jitter. Typically, retransmissions are not allowed and the quality of voice signal transmissions are controlled very tightly through dynamic power control. By contrast, data services utilizes best-effort, non-real time packet data services which do not place stringent requirements on delay and jitter. Data signals are transmitted using time-slotted transmissions on shared channels. Retransmissions are utilized to achieve extremely reliable data delivery while compensating for instantaneous physical layer losses due to fading.

There are currently two manners of implementing data services with voice services. The first proposal has been incorporated into the well known third generation CDMA standard (hereinafter referred to as 3G-1x), and involves providing data services using a same frequency carrier as the one on which the voice services are provided. The second proposal has been incorporated into the well known data only evolution of the third generation CDMA standard (hereinafter referred to as 3G-1x EVDO), and involves providing data services using a different frequency carrier than the frequency carrier on which the voice services are provided.

Both 3G-1x and 3G-1x EVDO utilize measured SIR at the receivers or mobile-telephones 16-k to control a parameter associated with the transmission of data from BS 14-i. Specifically, in 3G-1x, data is transmitted at fixed data rates utilizing measured SIR to control transmit power levels and, in 3G-1x EVDO, data is transmitted at fixed transmit power levels utilizing measured SIR to control data rates. Thus, data services in 3G-1x is similar to voice services in that both services are power controlled, whereas data services in 3G-1x EVDO is "rate controlled."

In 3G-1x, voice and data services are provided using a same frequency carrier. That is, the voice and data signals are parts of a single forward link, wherein the data signals are transmitted over data channels defined by Walsh codes in the forward link at transmit power $P_{data-dc}$ and "dc" denotes a specific data channel. Data is transmitted over dynamically power controlled data channels at fixed data rates such that the forward link has an associated SIR at the receiver which is at or near a target SIR. Without decreasing the number of available voice channels at BS 14-i, the addition of data channels at BS 14-i can cause the forward link transmit power $P_{fl}$ to, at times, exceed the maximum transmit power $P_{max}$ at BS 14-i due to the dynamics of power control. See FIG. 6, which depicts a chart 20 illustrating forward link transmit power $P_{fl}$ versus time at BS 14-i for a forward link comprising pilot, control, voice and data signals, i.e., $P_{fl} = \Sigma P_{pilot} + P_{control-cc} + P_{voice-tc} + P_{data-dc}$.

In 3G-1x EVDO, voice and data services are provided using separate frequency carriers. That is, the voice and data signals are transmitted over separate forward links defined by different frequency carriers. Data is transmitted over data channels at fixed data transmit powers $P_{data-dc}$ but at variable data rates. Specifically, measured SIR at the receiver is used to determine a data rate which can be supported by the receiver. Typically, the determined data rate corresponds to a maximum data rate at which a minimum level of quality of service can be achieved at the mobile-telephone. Higher measured SIR translates into higher data rates, wherein higher data rates involve higher order modulation and weaker coding than lower data rates. For example, if measured SIR at the receiver is 12 dB and −2 dB at two different receivers, then the data rates may be 2.4 mbs and 38.4 kbs at each of the respective receivers. See FIG. 7, which depicts a chart 30 illustrating forward link transmit power $P_{fl}$ versus time at BS 14-i over a data only frequency carrier, where $P_{fl} = \Sigma P_{data-dc}$.

However, the use of different frequency channels for voice and data services makes it difficult to support simultaneous real-time circuit switched services and non-real time best-effort packet data services for a same user. Significant changes to network architecture would be required. Accordingly, there exist a need to integrate voice and data services onto a same frequency channel.

SUMMARY OF THE INVENTION

The present invention integrates voice and data services onto a same frequency channel using available transmit power information to determine data rates, wherein the available transmit power information indicates an amount of transmit power available for future data transmissions over one or more data channels. In a "distributed" embodiment, a transmitter or base station transmits, via a forward link, an available power message to a receiver or mobile-telephone indicating an amount of available transmit power at some future time t+z. The mobile-telephone performs signal-to-interference measurements corresponding to the received forward link and received interference, and uses such signal-to-interference measurements and the available power message to determine a data rate that can be supported by the mobile-telephone. Preferably, the determined data rate corresponds to a maximum data rate at which a minimum level of quality of service can be achieved at the mobile-telephone. In a "centralized" embodiment, the mobile-telephone transmits the signal-to-interference measurements to the base station, and the base station determines the data rate based on the available transmit power at future time t+z.

BRIEF DESCRIPTION OF THE DRAWINGS

The features, aspects and advantages of the present invention will become better understood with regard to the following description, appended claims, and accompanying drawings where:

DETAILED DESCRIPTION

The present invention integrates voice and data services onto a frequency channel using available transmit power to determine data rates, wherein pilot, control, voice and data signals are parts of a single forward link associated with the frequency channel. In the present invention, voice services and other real-time circuit switched services, such as video, are dynamically power controlled to achieve a desired quality of service. By contrast, data services and other non-real time best-effort packet data services are rate controlled based on available transmit power. The present invention will be described herein with reference to forward link transmissions and to wireless communication systems based on CDMA technology transmitting a continuous pilot. It should be understood that the present invention is also applicable to reverse link transmissions and to wireless communication systems based on other multiple access technologies.

Figure 1:
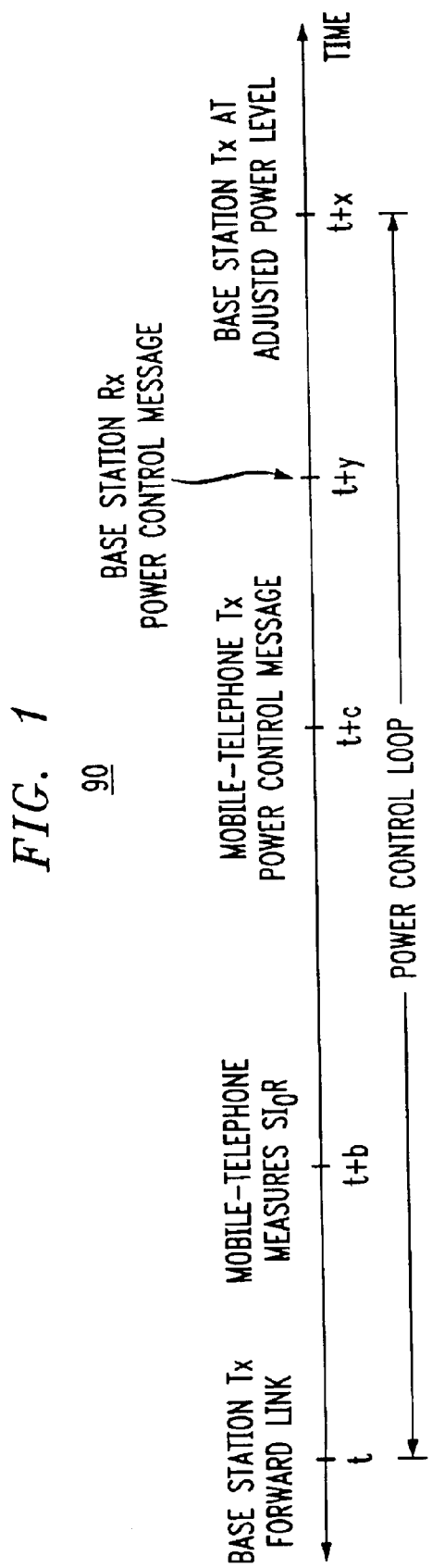
FIG. 1 depicts a time line illustrating power control over the forward link.

Voice services are dynamically power controlled in accordance with the present invention. In the forward link, at time instant t, the base station transmits a voice signal to a mobile-telephone over a dedicated traffic channel at transmit power $P_{voice-tc}(t)$, wherein "tc" denotes a specific traffic channel associated with the mobile-telephone to which the voice signal is intended. See FIG. 1, which depicts a time line 90 illustrating power control over the forward link. The forward link being associated with a frequency carrier and the traffic channel being defined by Walsh codes $W_{tc}$. At time instant t, the base station transmits a forward link signal. At time instant t+b, the mobile-telephone measures signal-to-interference ratio corresponding to the received forward link and the total received interference $I_o$, hereinafter referred to as $SI_oR$, over a time interval referred to herein as a "power control group." For purposes of this application, the term signal-to-interference ratio or similar ratio should be construed to include signal-to-interference ratio, carrier-to-interference ratio, signal-to-noise ratio, carrier-to-noise ratio, energy-per-bit-to-interference ratio or other similar measurements.

Based on the measured $SI_oR$ and a target $SI_oR$ associated with the mobile-telephone, at time t+c, the mobile-telephone transmits a power control message (or power control bits) to the base station indicating to the base station whether to increase or decrease the transmission power for its associated traffic channel, wherein the target $SI_oR$ corresponds to a desired quality of service for the mobile-telephone. At time instant t+y, the base station receives the power control message (or bits). At time instant t+x, the base station transmits the voice signal to the mobile-telephone at transmit power $P_{voice-tc}(t+x)$ via the forward link, where $P_{voice-tc}(t+x)$ is based on the power control message. Note that forward link transmit power $P_{fl}$ varies at a rate based on the duration of the power control group, and that the duration between time instant t and time instant t+x is referred to herein as a "power control loop," i.e., the power control loop spans a duration x.

Figure 2:
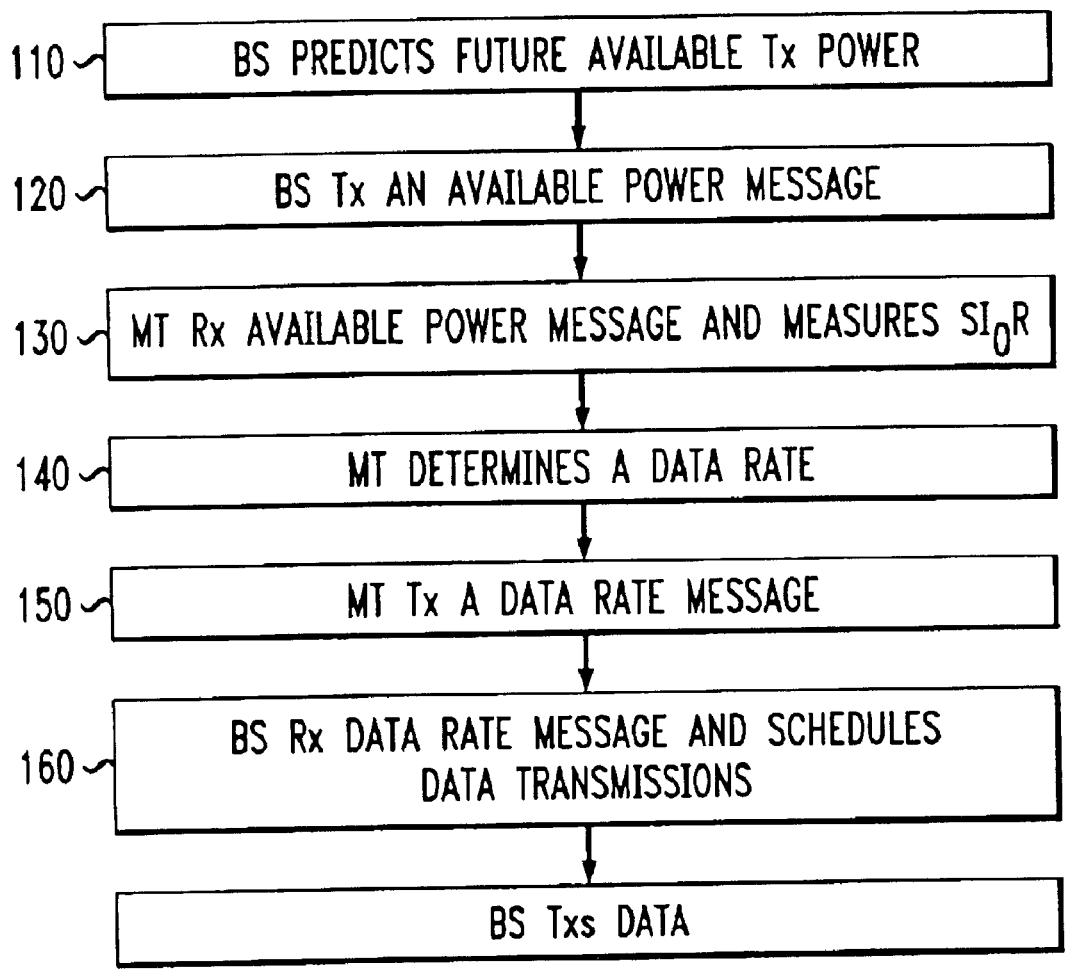
FIG. 2 depicts a flowchart illustrating a "distributed" manner of dynamically controlling data rate in accordance with the present invention.
Figure 3:
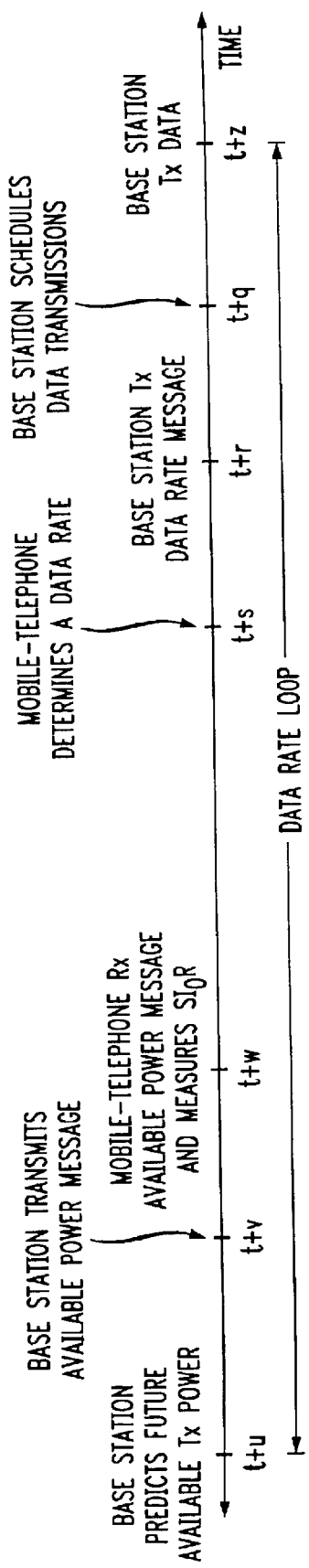
FIG. 3 depicts a time line illustrating rate control over the forward link.
Figure 4:
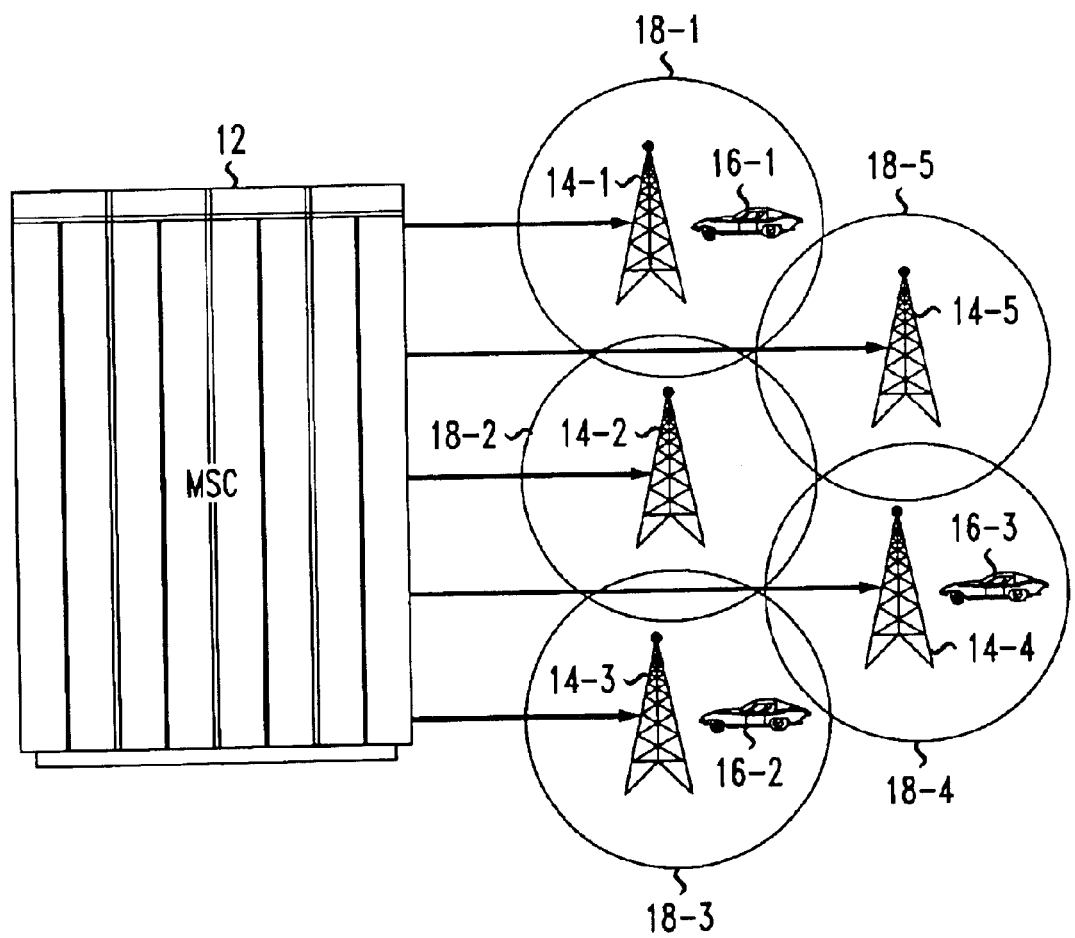
FIG. 4 depicts a wireless communication system employing CDMA techniques.
Figure 5:
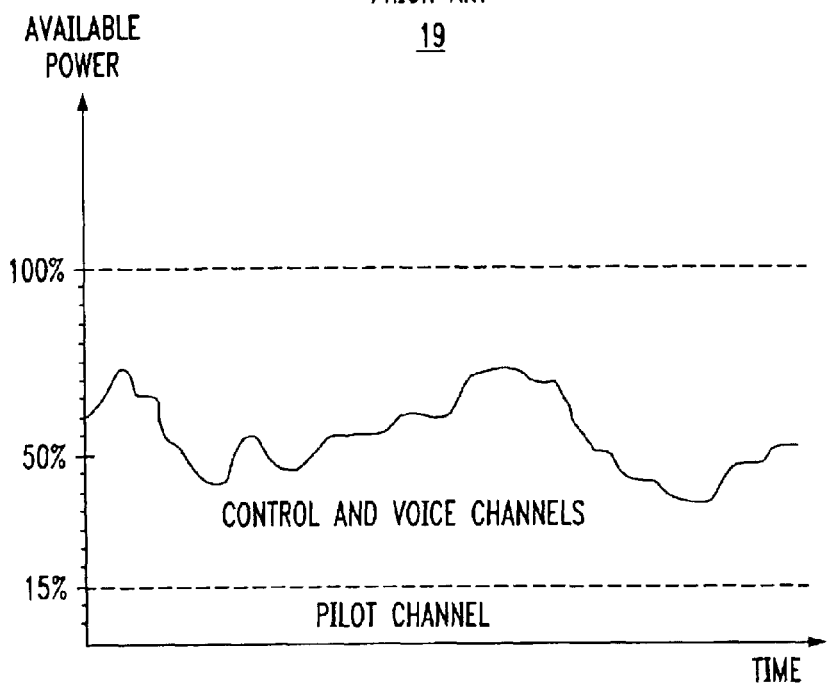
FIG. 5 depicts a chart illustrating forward link transmit power versus time for a forward link comprising pilot, control and voice signals.
Figure 6:
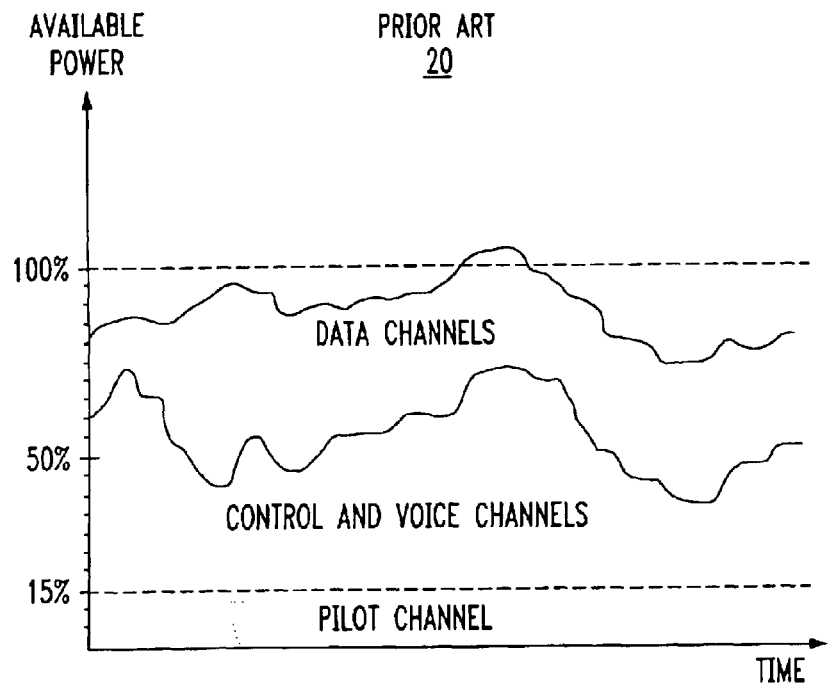
FIG. 6 depicts a chart illustrating forward link transmit power versus time for a forward link comprising pilot, control, voice and data signals.
Figure 7:
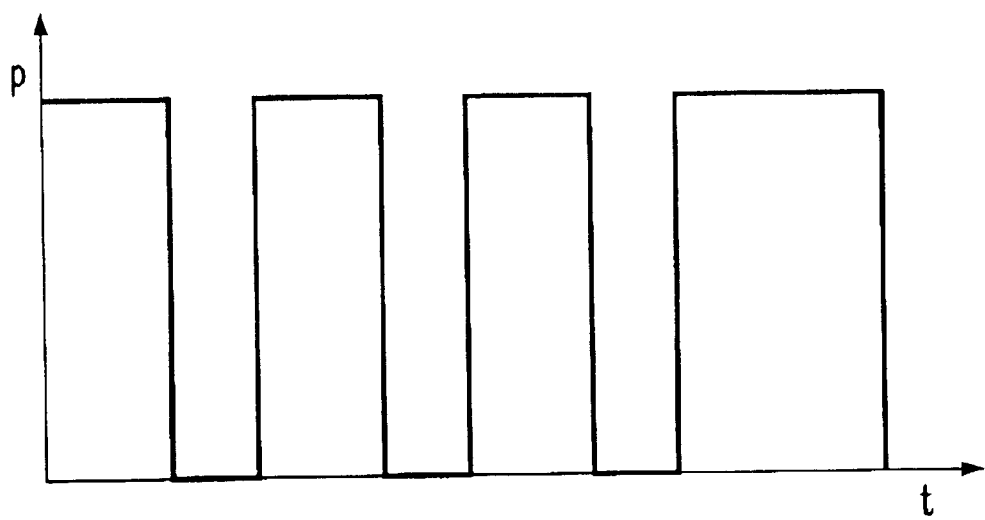
FIG. 7 depicts a chart illustrating forward link transmit power versus time over a data only frequency carrier.

Data services are dynamically rate controlled based on available transmit power and measured signal-to-interference ratio in accordance with the present invention. FIG. 2 depicts a flowchart 100 illustrating a "distributed" manner of dynamically controlling data rate, i.e., data rate is determined by mobile-telephones, in accordance with the present invention. In step 110, at time instant t+u, the base station predicts a future available transmit power $P_{avail-dc}(t+z)$ for time instant t+z at the base station for a data channel dc in the forward link, where u is greater than or equal to zero and z is greater than u. See FIG. 3, which depicts a time line 92 illustrating rate control over the forward link. The manners in which the present invention predicts future available transmit power $P_{avail-dc}(t+z)$ will be discussed later herein.

In step 120, at time instant t+v, the base station transmits an available power message to mobile-telephones within its associated cell (and, perhaps, in neighboring cells) to indicate the predicted future available transmit power $P_{avail-dc}(t+z)$ for the data channel. The available power message being transmitted on a forward link channel and may also include an indication of time instant t+z. In one embodiment, the available power message is transmitted on a forward link control channel, such as a forward link broadcast channel, or a forward link burst pilot channel. In step 130, at time instant t+w, the mobile-telephone receives the available power message and measures the $SI_oR$. Note that the mobile-telephone may receive the available power message and measure the $SI_oR$ at different time instants. In step 140, at time instant t+s, the mobile-telephone determines a data rate based on the available power message and measured $SI_oR$. Preferably, the determined data rate corresponds to a maximum data rate at which a minimum level of quality of service can be achieved at the mobile-telephone In one embodiment, data rate is determined directly from measured $SI_oR$. That is, the measured $SI_oR$ is translated into a data rate by the mobile-telephone. For example, there is a one-to-one mapping between $SI_oR$ and data rate, or an equation or algorithm is used to translate $SI_oR$ to data rate.

In another embodiment, data rate is determined using signal-to-interference ratio corresponding to the received forward link and interference not caused by the cell from which the received forward link was transmitted, hereinafter referred to herein as other-cell interference $SI_{oc}R$. Specifically, other-cell interference $I_{oc}$ is equal to interference caused by the transmission of signals by other cells and spurious noise, or to the total received interference $I_o$ less same cell interference $I_{sc}$, wherein same cell interference $I_{sc}$ corresponds to the signal strength of the received forward link.

In one embodiment, the available power message indicates a ratio or fraction between pilot transmit power $P_{pilot}(t)$ and forward link transmit power $P_{fl}(t)$, i.e., pilot-forward link ratio, on a time slot basis, wherein such ratio can be used to predict future available transmit power $P_{avail-dc}(t+Z)$ using known pilot transmit power $P_{pilot}$. For example, the pilot-forward link ratio indicated in the available power message is ½. If the pilot transmit power $P_{pilot}$ is 15% of the maximum transmit power $P_{max}$ and maximum transmit power $P_{max}$ is 100 watts, then $P_{pilot}$ is 15 watts, $P_{fl}$ is 30 watts and $P_{avail-dc}(t+z)$ is 70 watts. The available power message may, in the alternate or in combination, indicate the pilot-forward link ratio for future pilot transmit power $P_{pilot}(t+z)$ and future forward link transmit power $P_{fl}(t+z)$. In another embodiment, the available power message may be a burst pilot signal which is transmitted over the data channel at a known percentage of the current or future available transmit power level. In this embodiment, the received signal strength of the burst pilot can be used to determine or predict the future available transmit power $P_{avail-dc}(t+z)$ The available power message or $P_{pilot}/P_{fl}$ ratio may be encoded using different number of bits corresponding to allowed quantization levels of the $P_{pilot}/P_{fl}$ ratio. If more bits are used to encode the $P_{pilot}/P_{fl}$ ratio, the $P_{pilot}/P_{fl}$ ratio can be more granular (thus, more accurate data rate prediction). However, the transmit power required for the forward link broadcast channel will also be larger in this case. It is also possible to encode both $P_{pilot}/P_{fl}$ ratio for a current time slot and a delta between the current and a predicted $P_{pilot}/P_{fl}$ ratio change for the next time slot in which data is to be transmitted, thereby reducing the overall number of bits used to encoded the $P_{pilot}/P_{fl}$ ratio. If the data rate loop is tight or sufficiently fast, the number of bits needed to encode delta $P_{pilot}/P_{fl}$ ratio would be fewer.

In an embodiment, the available power message may also indicate predicted future forward link transmit power and/or predicted future data activity or transmissions of the base station from which the available power message was transmitted and/or neighboring base stations for time instant t+z. Such predicted future forward link transmit power and data activity information may be used to predict future interference $I_o$, which can then be used to better estimate data rate for time instant t+z.

In step 150, at time instant t+r, the data rate is transmitted to the base station via a data rate message on a reverse link channel. In one embodiment, the data rate message is transmitted on a reverse link fast feedback channel. In step 160, at time instant t+q, the base station schedules time-slotted data transmissions based on the data rate message. In one embodiment, the base station schedules time-slotted data transmissions to mobile-telephones capable of receiving data at higher data rates before mobile-telephones capable of receiving data at lower data rates. In step 170, the data is transmitted at time instant t+z. Note that the duration between time instant t+u and time instant t+z is referred to herein as a "data rate loop," i.e., data rate loop is equal to z–u.

FIG. 2 represents a "distributed" embodiment of the present invention in which the mobile-telephones perform the translation of measured $SI_oR$ to data rate. In the distributed embodiment, the mobile-telephone is operable to translate measured signal-to-interference ratio to a data rate, and the base station provides the mobile-telephone with all the necessary information to perform such translation, e.g., future available transmit power $P_{avail-dc}(t+z)$. In a "centralized" embodiment, the translation of measured signal-to-interference ratio to the data rate may be performed by the base station. In this embodiment, the mobile-telephone transmits the measured $SI_oR$ to the base stations, and the base station determines the data rate based on the predicted future available transmit power $P_{avail-dc}(t+z)$ and measured signal-to-interference ratio.

As mentioned earlier, a number of manners may be used in performing step 110, i.e., the base station predicts future available transmit power $P_{avail-dc}(t+z)$. Basically, the predicted future available transmit power $P_{avail-dc}(t+z)$ is based on the maximum transmit power $P_{max}$ associated with the frequency carrier and the forward link transmit power $P_{fl}$ for the same frequency carrier. In one embodiment, the predicted future available transmit power $P_{avail-dc}(t+z)$ is equal to the difference between $P_{max}$ and current forward link transmit power $P_{fl}(t)$, i.e., $P_{avail-dc}(t+z)=P_{max}-P_{fl}(t)=P_{avail-dc}(t)$.

In another embodiment, the predicted future available transmit power $P_{avail-dc}(t+z)$ is equal to the difference between $P_{max}$ and predicted future forward link transmit power $P_{fl}(t+z)$. The future forward link transmit power $P_{fl}(t+z)$ may be predicted based on power control messages received from mobile-telephones being served by the base station and current transmit powers $P_{voice-tc}(t)$. Specifically, if the data rate loop is faster than the power control loop, i.e., (z−u)>x, then it may be possible for the mobile-telephones to receive available power messages with predicted future forward link transmit power $P_{fl}(t+z)$ that was based on power control messages, calculate data rates for time instant t+z, and transmit the calculated data rate to the base station just in time for the transmit power of power controlled users to be adjusted at the base station. Power controlled users being users that utilize applications which are delay-constrained real-time services with quasi-circuit switched connections that are power controlled, such as voice, video, data in 3G-1x, etc. users. By contrast, rate controlled users are users that utilize applications which are delay-tolerant non-real time services with packet switched connections that are rate controlled and scheduled in best effort manner, such as are data in 3G-1x EVDO (web browsing HTTP, FTP, e-mail, etc.).

If the data rate loop is not faster than the power control loop, i.e., (z−u)≦x, then the data rate calculation may provide for Epsilon or a margin of error (due to a difference between predicted and actual future available transmit power), or the base station may correct for errors in the data rate determination of the mobile-telephone in some other manner, such as via hybrid ARQ or limited blind data rate detection. For example, the base station may reserve some transmit power for cases where actual future available transmit power is less than the predicted future available transmit power. In another example, the base station either relies on retransmissions to correct errors in data rate determination due to transmissions at lower power levels than initially determined, or transmits at a lower rate than that determined by the mobile-telephone (and the mobile-telephone has to determine the actual transmission data rate).

The present invention will now be described with reference to specific embodiments of wireless communication systems. In a first embodiment, the wireless communication system transmits a continuous pilot signal over a pilot channel. The following is an example describing the flow of information exchange and distributed processing that may conceivably take place in this embodiment. A base station transmits an available power message indicating pilot-forward link ration $P_{pilot}(t)/P_{fl}(t)$, predicted data traffic fraction $P_{avail-dc}(t+\Delta t)/P_{fl}(t+\Delta t)$, and predicted data activity bit $FAC(t+\Delta t)$ over a forward link broadcast channel to all mobile-telephones to which the base station is linked, wherein predicted data traffic fraction is the ratio between predicted future available transmit power and predicted future forward link transmit power, and predicted data activity bit indicates whether the base station will be transmitting data at time instant $t+\Delta t$. The term $\Delta t$ represents the time interval of "look ahead" available to the base station for predicting the amount of transmit power utilized by the power controlled users and, in one embodiment, is on the order of a couple of PCGs, wherein the time interval of look ahead corresponds to the duration between the receipt of power control messages by the base station and transmissions at power levels based on those received power control messages, i.e., x-y. Note that the base station also broadcasts Walsh code information anticipated at time instant $t+\Delta t$ such that the mobile-telephone knows which Walsh codes to use for decoding data transmissions.

At time instant t, the mobile-telephone measures $SI_oR(i,t)$ of a best serving base station i in an active set of base stations, e.g., active set base station with the strongest signal strength at the mobile-telephone, as well as $SI_oR(j,t)$ of neighboring base stations j, wherein neighboring base stations j includes other active set base stations (other than the best serving base station i) and, perhaps, candidate base stations. At the same time the mobile-telephone reads the data traffic fractions $P_{avail-dc}(t+\Delta t)/P_{fl}(t+\Delta t)$ and data activity bits $FAC(t+\Delta t)$ indicated in available power messages transmitted by base station i and neighboring base stations j, and utilizes this information together with the measured $SI_oR(i,t)$ and $SI_oR(i,t)$ to compute $SI_oR(j+\Delta t)$ and corresponding data rate for time instant $t+\Delta t$ based on the computed $SI_oR(i,t+\Delta t)$. For example, if the data activity bits $FAC(t+\Delta t)$ indicate that a certain base station will not be transmitting data at time instant $t+\Delta t$, then the interference attributed to that base station may be lowered. The mobile-telephone transmits, preferably every time slot, the computed data rate to the best serving base station i.

At the best serving base station i, the mobile-telephone computed data rate for time instant $t+\Delta t$ is adjusted by base station i according to the error Epsilon induced by an imperfect look ahead of the amount of transmit power to be utilized by the power controlled users. For example, if the actual available future transmit power is less than the predicted future transmit power, then the rate at which data is transmitted would be lower than what was computed by the mobile-telephone. Optionally, base station i further backs-off for variations due to Doppler shifts and Epsilon, and computes the final data rates for each mobile-telephone.

Incremental redundancy techniques (IR) can be used to maintain the same information rate but adapt the coding gains instead, i.e., the back-off can be minimized via efficient IR schemes.

Base station i schedules one mobile-telephone for service at time instant $t+\Delta t$. If the base station computed data rate differs from the mobile-telephone computed data rate, base station i indicates the base station computed data rate explicitly in a header along with a MAC ID via preamble or user code. Alternately, blind data rate detection around the data rate that corresponds to the mobile-telephone computed data rate may be used. Additionally, IR based schemes may be used to adapt the code rate to the Epsilon as well as changes in the data rate due to channel. In this case, neither explicit data rate information nor blind rate detection at MS is required, since the mobile-telephone computed data rate is maintained.

Note that in a centralized embodiment, the mobile-telephone does not compute the data rates, and base station i would compute the data rate based on mobile-telephone measured $SI_oR$, predicted future available transmit power $P_{avail-dc}(t+\Delta t)$ and, perhaps, predicted data traffic fraction $P_{avail-dc}(i,t+\Delta t)/P_{fl}(i,t+\Delta t)$, predicted data activity bit FAC(i, t+$\Delta t$), Doppler shifts, etc.

In a second embodiment of the present invention, the wireless communication system transmits a continuous pilot signal over the pilot channel and a data activated burst pilot signal, wherein the forward link transmit power $P_{fl}$ is equal to the maximum transmit power $P_{max}$ when the data activated burst pilot signal is transmitted. The data activated burst pilot signal being transmitted only when there is data to be transmitted. In this embodiment, the available power message may not be necessary only when the data activated burst pilot signal is being transmitted.

In a third embodiment of the present invention, the wireless communication system transmits a continuous pilot signal over the pilot channel and a continuous burst pilot signal, wherein the forward link transmit power $P_{fl}$ is equal to the maximum transmit power $P_{max}$ when the continuous burst pilot signal is transmitted. The continuous burst pilot signal being continuously transmitted (even in the absence of data transmission). In this embodiment, the available power message can be the continuous burst pilot because the future available transmit power $P_{avail-dc}(t+\Delta t)$ can be estimated from the received signal strength of the continuous burst pilot signal. That is, if $P_{b-pilot}$ represents the transmit power of the burst pilot, $R_{b-pilot}$ represents the received signal strength of the burst pilot and $R_{pilot}$ represents the received signal strength of the pilot, then:

$$P_{b-pilot}/P_{fl}=(P_{pilot}/P_{fl})*(R_{b-pilot}/R_{pilot})$$

In yet another, the wireless communication system does not transmit a continuous pilot but does transmit a common burst pilot to all users periodically at known instants of time. Such a common burst pilot can also be coordinated for simultaneous transmission across base stations of a system. In such an embodiment, the transmittal of the available power fraction and data activity to the data users over a broadcast channel will be necessary to perform the data rate computation accurately in a distributed (mobile-telephone based) implementation. This may not be necessary in a centralized implementation wherein the base station translates the mobile-telephone measured SIRs into appropriate data rates. The accuracy of this translation (or computing an effective SIR) may be improved to take into account the predicted other cell interference levels by exchange of the predicted power fractions and data activity bits between neighboring base stations over a fast backhaul. However, in such centralized implementations, it may be necessary in the interest of accuracy for the mobile-telephone to feedback the SIR it measures from each of the base stations in its vicinity that the mobile-telephone can possibly be Although the present invention has been described in considerable detail with reference to certain embodiments, other versions are possible. Therefore, the spirit and scope of the present invention should not be limited to the description of the embodiments contained herein.

We claim:

1. A method of determining a data rate comprising the steps of:
   receiving an available power message at a receiver indicating future available transmit power at a transmitter;
   performing a signal-to-interference measurement at the receiver for a signal transmitted by the transmitter; and
   determining a data rate using the future available transmit power and the measured signal-to-interference ratio.

2. The method of claim 1, wherein the available power message includes a pilot-forward link ratio or a burst pilot transmitted using a known percentage of current available transmit power.

3. The method of claim 2, wherein the pilot-forward link ratio indicates current pilot transmit power and current forward link power.

4. The method of claim 2, wherein the pilot-forward link ratio indicates future pilot transmit power and future forward link power.

5. The method of claim 2, wherein the available power message indicates Doppler effects associated with the receiver.

6. The method of claim 2, wherein the available power message indicates future data activity of the transmitter.

7. The method of claim 2, wherein the available power message indicates future data activity of other transmitters.

8. The method of claim 7, wherein the step of determining the data rate comprises the steps of:
   predicting a future signal-to-interference measurement using the future data activity of the other transmitters which may cause interference to data transmissions from the transmitter.

9. The method of claim 8, wherein the data rate is based on the predicted future signal-to-interference measurement.

10. The method of claim 1, wherein the step of determining the data rate comprises the steps of:
    performing signal-to-interference measurements at the receiver for signals transmitted by other transmitters.

11. The method of claim 10, wherein the data rate is based on the signal-to-interference measurements of the other transmitters.

12. The method of claim 10, wherein the step of performing the signal-to-interference measurement comprises the steps of:
    determining an other cell signal-to-interference measurement based on the signal-to-interference measurement of the transmitter.

13. The method of claim 1 comprising the additional step of:
    transmitting the determined data rate to the transmitter.

14. The method of claim 13 comprising the additional step of:
    receiving a data transmission from the transmitter at or about the determined data rate.

15. A method of determining a data rate comprising the steps of:
    transmitting an available power message to a receiver indicating future available transmit power at a transmitter;
    receiving a data rate message transmitted by the receiver indicating a data rate at which the receiver can receive data, wherein the data rate is based on a signal-to-interference measurement made at the receiver and the available power message.

16. The method of claim 15, wherein the available power message includes a burst pilot transmitted at a known percentage of current available transmit power.

17. The method of claim 15, wherein the available power message includes a pilot-forward link ratio.

18. The method of claim 15, wherein the available power message is based on power control messages.

19. The method of claim 15 comprising the additional step of:

scheduling data transmissions based on the received data rate message.

20. The method of claim 15 comprising the additional step of:

adjusting the data rate indicated in the received data rate message.

21. The method of claim 20 comprising the additional step of:

transmitting data to the receiver the adjusted data rate.

22. The method of claim 15 comprising the additional step of:

transmitting data to the receiver at or about the data rate indicated in the received data rate message.

23. A method of determining a data rate comprising the steps of:

performing a signal-to-interference measurement at a receiver for a forward link signal transmitted by a transmitter;

transmitting the signal-to-interference measurement to the transmitter; and receiving an indication of a data rate based on future available transmit power at the transmitter and the measured signal-to-interference.

24. The method of claim 23 comprising the additional step of:

receiving data transmissions at the indicated data rate.

* * * * *